May 23, 1933.                   B. B. LEGG                    1,910,021
                           SOIL TESTING APPARATUS
                             Filed Nov. 7, 1930
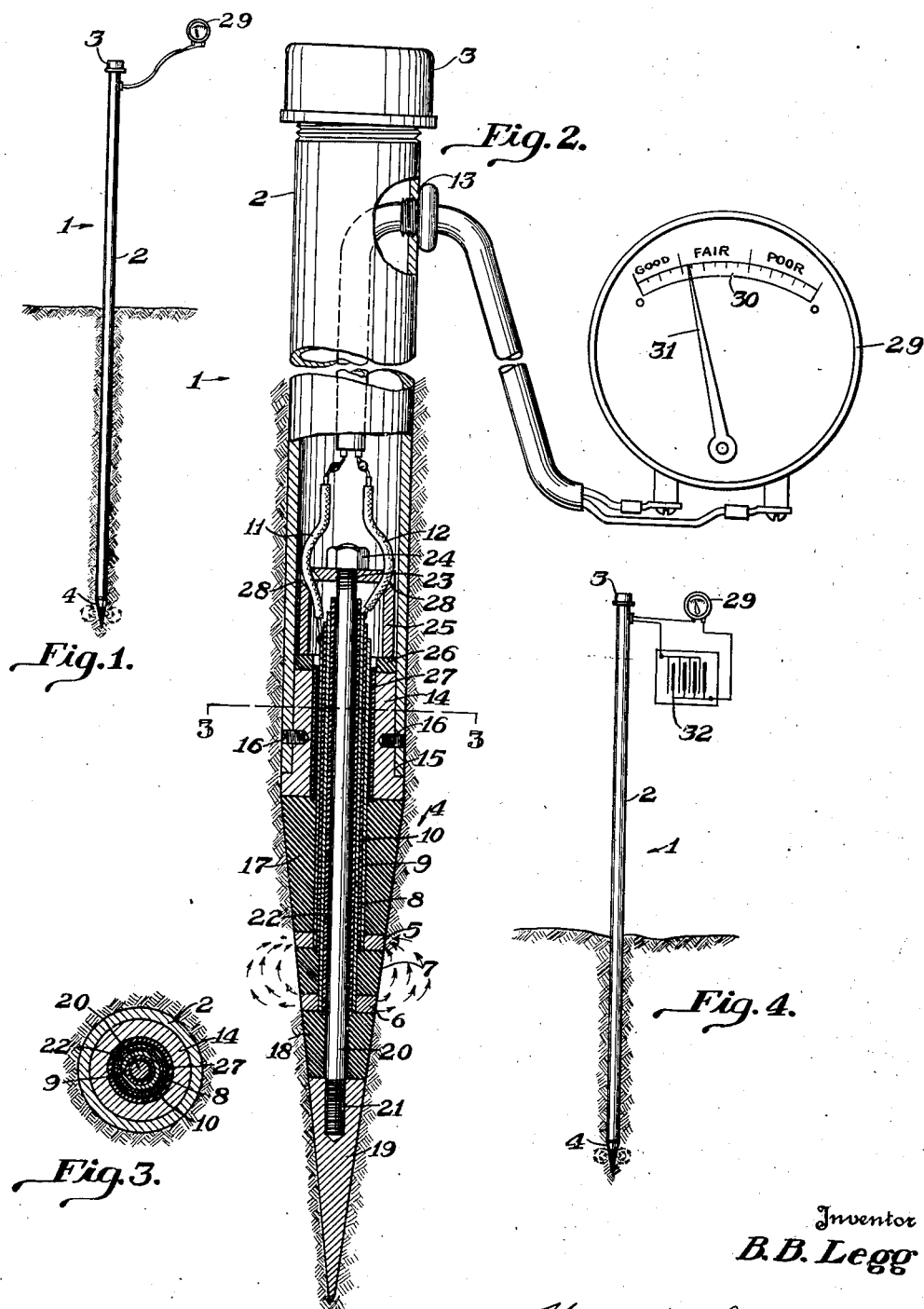
Inventor
B. B. Legg
By W. S. McDowell
Attorney Patented May 23, 1933

1,910,021

UNITED STATES PATENT OFFICE

BUELL B. LEGG, OF COLUMBUS, OHIO, ASSIGNOR TO COLUMBIA ENGINEERING AND MANAGEMENT CORPORATION, OF CINCINNATI, OHIO, A CORPORATION OF OHIO

SOIL TESTING APPARATUS

Application filed November 7, 1930. Serial No. 494,033.

This invention relates to a method and apparatus for determining the corrosivity of soil or soils, and is more particularly directed to means for performing these tests in place at points where soil survey is conducted.

Soil surveys are made mainly to analyze the soil in determining its corrosive effect on underground metallic structures, and companies, as generally known, owning and operating such structures are particularly active in protecting these structures against the deleterious action of soil electrolysis. The protective means for such metallic structures may be in the form of a covering made from corrosion resisting material or the metal may be coated or treated with a substance which protects the metal from the destructive properties of the soil.

A large amount of test work has been and is being conducted to ascertain the condition of the soil before placing the metallic structures therein, as, for example, in the proposed laying of pipe lines for gas or oil soil, surveys have been made upon the proposed right of way for these structures which has consisted in the analysis of soil samples obtained from various points where the pipe line is to be laid. Heretofore, tests of this nature have been held in laboratories after obtaining soil samples and subjecting the same to laboratory methods for determining the corrosivity thereof, which methods necessitate the removal of soil samples and attendant difficulties and inaccuracies. This method is unsatisfactory for the reason that it is slow and cumbersome and at times causes unnecessary delay awaiting the outcome of the tests.

To overcome these objections or difficulties use is made of a simple method and apparatus for determining these tests in place or at the location along the proposed course of the metallic structure so that such tests may be performed without removing soil samples which involves considerable expense and labor. This method is carried out by the employment of an apparatus including a pair of metal electrodes in contact with the soil under test and connecting with said electrodes a current flow indicator, which may be a voltmeter or ammeter, for determining the differences of potential between the electrodes and the current flowing between the same when the electrodes are inserted in the earth.

It is well known that the corrosivity of the soil depends upon the properties thereof as an electrolyte, and these properties are indicated by the difference of potential set-up when two electrodes are immersed in the electrolyte, by the polarization set-up when current flows betwen the electrodes, and by the electric resistivity of the electrolyte. The corrosivity of the soil is proportional to the difference of potential betwen the electrodes and inversely proportional to the polarization or back electromotive force and to the resistivity of the soil. In an apparatus having fixed dimensions and specified electrode metals, the proportional factors are fixed and may be determined experimentally, and having been determined once and for all, the soil resistivity can be computed by observing the readings of the current flow indicator when the apparatus is inserted in the soil under investigation.

For a further understanding of the invention, reference is to be had to the following description taken in connection with the accompanying drawing, wherein:

Figure 1 is a vertical sectional view taken through the earth, showing the apparatus comprising the present invention in its operative position, Figure 2 is a view on an enlarged scale showing the lower portion of the apparatu. in vertical section, Figure 3 is a horizontal sectional view taken on the line 3—3 of Figure 2, Figure 4 is a view similar to that of Figure 1 with a source of electrical energy connected in the circuit with the apparatus.

Referring more particularly to the drawing, the numeral 1 designates the testing apparatus in its entirety and which in this instance for convenience comprises an elongated member which may be a metallic tubing 2 of any suitable length for the convenient handling of the apparatus. The upper end of this tubing may be closed by means of a cap 3 and the lower end thereof closed by the tapered testing plug assembly generally indicated by the numeral 4. This plug assembly includes a pair of metallic rings 5 and 6 which in this instance may be made of steel and copper although it will be understood that any suitable metals for this purpose may be employed such as bronze, copper, aluminum or other dissimilar metals. The rings 5 and 6 are spaced from one another by an insulating member 7 and are attached to one end of metallic sleeves or tubings 8 and 9 arranged in spaced order from one another by a sleeve 10 formed of fiber or other insulating material. Attached to the inner ends of the sleeves 8 and 9 by solder or other securing means are electric terminals 11 and 12 which are properly insulated and lead to the upper end of the tubing 2 and extend through an opening 13 to the exterior of the tubing. The outer ends of the terminals 11 and 12 are adapted to be attached to an electrical instrument, the purpose of which will appear later.

The inner end of the plug assembly 4 is provided with a metallic collar 14 which is reduced as at 15 to snugly fit the lower end of the tubing 2 and which collar is attached thereto by means of set screws and the like 16 to hold the plug assembly in rigid relationship with the tubing 2. Positioned between the lower end of the collar 14 and the upper of the metallic rings is an insulating member 17, and arranged below the lower ring is a similar insulating member 18. Also located below the insulating member 18 is a tapered point 19 preferably made of a good grade of steel and case-hardened so that the point will be capable of withstanding wear and hard usage when the apparatus is driven into the soil. To hold the various parts in their assembled order a rod 20 is positioned axially of the plug which has its lower end threaded as at 21 and received within a similarly threaded bore formed in the inner end of the driving point 19. This rod is insulated from the inner metallic tubing 8 by a fiber sleeve 22 and has its upper end threaded as at 23 for the reception of a tightening nut 24 engaging the inner closed end of the metallic cap member 25. Positioned between the open end of this cap member and the collar 14 is a fiber washer 26, and positioned between the collar 14 and the outer metallic tubing 9 is a sleeve 27 of insulating material. The cap member 25 is formed with openings 28 at its inner end through which the terminals 11 and 12 extend or project to the exterior of the plug assembly. By the provision of the rod 20 and the nut 24 all of the parts comprising the plug assembly will be held rigidly united in a clamped relationship. The insulating spacing members 7, 17 and 18 and the rings 5 and 6 together with the point 19 are all tapered to produce a long conical point upon the lower end of the instrument to enable the same to be readily driven into the soil and to form a firm contact between the metallic rings 5 and 6 and the soil for the proper working of the instrument.

The metallic rings 5 and 6 which are connected to the terminals 11 and 12 by the sleeves 8 and 9 are spaced and insulated from one another, serving as the lower ends of the terminals 11 and 12 and as these terminals are inserted into the soil an electric current is set-up between the electrodes due to the electrolytic properties of the soil. The strength of this current, which is in proportion to the corrosivity of the soil or vice versa, may be measured, as stated before, by an electrical instrument or flow indicator connected to the other ends of the terminals. In an apparatus where the dimensions are the same and the electrodes are of a specified metal, the proportional factors are fixed and may, by experiments, be determined, and after once having been determined the soil resistivity may be computed by observing the readings of the current flow indicator when the testing end of the apparatus is inserted into the soil.

The current flow indicator may be of the voltmeter or ammeter type, which is designated by the numeral 29, and is provided with a graduated scale 30 over which a hand or indicating needle 31 is movable. The scale 30 may be graduated into milliamperes or divided into a number of zones marked, for example, good, fair, and poor. Thus, if the apparatus is positioned in a soil which is poor in electrolytic properties, the current set-up will be weak causing the indicating hand to move to a point within the first zone giving the indication that the soil is good and that the corrosivity is low and therefore suitable for the placing of metallic structures therein with little or no protection required thereon. In cases where the corrosivity of the soil is high or greater, the difference of potential between the electrodes is, of course, greater in proportion causing the indicating hand of the instrument to move to one of the other zones depending upon the current flow set-up.

It will be understood that the apparatus may be used with or without a primary source of current and as disclosed in Figure 4, an electrical battery 32 is connected in a circuit with the electrodes and that the full current from the battery, which will vary with the resistant condition of the soil, is thus indicated by the movement of the indicating hand of the current flow indicator or meter.

From the foregoing description taken in connection with the accompanying drawing it will be seen that an apparatus for determining the corrosivity of soil or soils has been provided by which tests may be made in place at the location where underground structures are to be placed eliminating the necessity of resorting to lengthy or drawn-out laboratory methods for determining these tests. The apparatus permits the tests to be carried out with great speed and accuracy without difficulty and because of the novel construction of the apparatus the same may be easily transported from one place to another where tests are to be performed.

Although I have described what I consider to be the preferred form of the invention, it will be understood that various changes may be made in the construction of the apparatus and in the manner in which it is operated, as for instance the apparatus may be made in two separate parts, each carrying an electrode which may be connected up in circuit with one another. Another such change may be that instead of forming the apparatus with a tapered lower end for facilitating the insertion thereof into the soil, this end may be formed blunt and a bore made in the earth or the soil by a pilot-bar before the insertion of the apparatus into the soil. It is also possible that materials other than metal may be used for obtaining the relative corrosivity of the soil under test in place or by removing soil and testing the same by electrical or electro-chemical means.

What is claimed is:

1. A soil testing apparatus comprising an elongated tubular member, a testing plug assembly carried by the lower end of said tubular member, said assembly including a pair of spaced metallic members adapted for engagement with the soil when the plug assembly is driven into the soil, said metallic members being insulated from one another and having attached thereto metallic sleeves also insulated from one another and which sleeves extend into the lower portion of said tubular member, and conductors secured to the upper ends of said sleeves, said conductors leading to a current flow indicator.

2. A soil testing apparatus comprising an elongated tubular member closed at its upper end, a testing assembly carried by the lower end of said tubular member, said assembly including a pair of spaced metallic rings adapted for engagement with the soil under test when the plug assembly is driven into the soil, said rings being insulated from one another and having attached thereto metallic sleeves also insulated from one another in the soil and which sleeves extend into the lower end of said tubular member, conductors secured to the upper ends of said sleeves, said conductors leading to a current flow indicator, and a driving point provided upon the lower extremity of said testing plug assembly.

3. An instrument for conducting localized soil tests, comprising a rigid elongated tubular body having its lower end closed and pointed to facilitate the direct insertion of the body into the soil to be tested, spaced conical anode and cathode terminals rigidly positioned on the lower end of said body for direct contact with the soil, and spaced conductors leading from said terminals and extending upwardly through said body to a current indicator disposed above the soil.

4. A device for determining soil corrosivity, comprising an elongated rigid walled tubular body, a tapering sharp pointed earth penetrating member secured to the lower end of said body, and a pair of spaced conical electrodes carried by said member for direct contact with soil in which said member is driven, said electrodes constituting a part of an electric circuit leading to a current measuring instrument disposed above the soil.

5. An instrument for determining the corrosivity of soil with respect to metallic bodies adapted to be placed therein, comprising a rigid elongated member having a closed sharp pointed lower end to facilitate the insertion of the instrument into the soil to be tested, relatively spaced and stationary conical electrodes of dissimilar metals carried by the lower end of said member for direct contact with the soil, and circuit establishing means leading from said electrodes to an above ground current measuring instrument.

6. An instrument for determining the corrosivity of soil with respect to metallic bodies adapted to be placed therein comprising an elongated conical casing adapted to be inserted in the soil, said conical casing having concentric spaced conical electrodes fixed relatively to the casing, said electrodes adapted to be connected to indicating means and being capable of direct contact with the soil to be tested.

In testimony whereof I affix my signature.

BUELL B. LEGG.